United States Patent
Yang et al.

(10) Patent No.: US 11,355,825 B2
(45) Date of Patent: Jun. 7, 2022

(54) BATTERY PACK AND MANUFACTURING METHOD THEREFOR

(71) Applicant: LG CHEM, LTD., Seoul (KR)

(72) Inventors: Jin Oh Yang, Gyeongsangbuk-Do (KR); Seog Jin Yoon, Cheongju-Si (KR)

(73) Assignee: LG Energy Solution, Ltd., Seoul (KR)

( * ) Notice: Subject to any disclaimer, the term of this patent is extended or adjusted under 35 U.S.C. 154(b) by 251 days.

(21) Appl. No.: 16/477,773

(22) PCT Filed: Feb. 19, 2018

(86) PCT No.: PCT/KR2018/002010
§ 371 (c)(1),
(2) Date: Jul. 12, 2019

(87) PCT Pub. No.: WO2018/221836
PCT Pub. Date: Dec. 6, 2018

(65) Prior Publication Data
US 2019/0372085 A1 Dec. 5, 2019

(30) Foreign Application Priority Data
May 29, 2017 (KR) .................. 10-2017-0066248

(51) Int. Cl.
*H01M 50/581* (2021.01)
*H01M 10/613* (2014.01)
*H01M 10/6551* (2014.01)
*H01M 10/6553* (2014.01)
*H01M 10/6554* (2014.01)
(Continued)

(52) U.S. Cl.
CPC ....... *H01M 50/581* (2021.01); *H01M 10/052* (2013.01); *H01M 10/613* (2015.04); *H01M 10/647* (2015.04); *H01M 10/6551* (2015.04); *H01M 10/6553* (2015.04); *H01M 10/6554* (2015.04); *H01M 2200/103* (2013.01)

(58) Field of Classification Search
None
See application file for complete search history.

(56) References Cited

U.S. PATENT DOCUMENTS

2010/0159313 A1 6/2010 Byun et al.
2011/0039134 A1 2/2011 Kim et al.
(Continued)

FOREIGN PATENT DOCUMENTS

CN 101164216 A 4/2008
CN 101389185 A 3/2009
(Continued)

OTHER PUBLICATIONS

International Search Report (PCT/ISA/210) issued in PCT/KR2018/002010, dated May 30, 2018.
(Continued)

*Primary Examiner* — Robert S Carrico
(74) *Attorney, Agent, or Firm* — Birch, Stewart, Kolasch & Birch, LLP (57) ABSTRACT

A battery pack and a method for manufacturing the same, and more particularly, a battery pack in which a heat dissipation member is attached to a protection element assembly to reduce heat generated from the battery pack when being discharged and a method for manufacturing the same.

12 Claims, 5 Drawing Sheets

(51) Int. Cl.
*H01M 10/647* (2014.01)
*H01M 10/052* (2010.01)

(56) References Cited

U.S. PATENT DOCUMENTS

| | | | |
|---|---|---|---|
| 2012/0106015 A1 | 5/2012 | Kwak et al. | |
| 2013/0089762 A1* | 4/2013 | Hong | H01M 10/65 429/62 |
| 2014/0349151 A1 | 11/2014 | Tsukamoto | |
| 2015/0064518 A1* | 3/2015 | Chen | H01M 50/581 429/62 |
| 2016/0126531 A1 | 5/2016 | Kim et al. | |

FOREIGN PATENT DOCUMENTS

| | | |
|---|---|---|
| EP | 2 579 384 A1 | 4/2013 |
| EP | 2 733 755 A2 | 5/2014 |
| JP | 2000-173580 A | 6/2000 |
| JP | 2010-147021 A | 7/2010 |
| JP | 2015-005488 A | 1/2015 |
| JP | 2015-88380 A | 5/2015 |
| JP | 2015-88381 A | 5/2015 |
| KR | 10-2011-0016821 A | 2/2011 |
| KR | 10-1146455 B1 | 5/2012 |
| KR | 2012-0050799 A | 5/2012 |
| KR | 10-2012-0061004 A | 6/2012 |
| KR | 10-2014-0113208 A | 9/2014 |
| KR | 10-2016-0067561 A | 6/2016 |
| KR | 10-2016-0138809 A | 12/2016 |
| KR | 10-2017-0023466 A | 3/2017 |

OTHER PUBLICATIONS

European Search Report for Appl. No. 18810275.0 dated Dec. 6, 2019.

* cited by examiner

|  | 1-1 | 1-2 | 1-3 |
|---|---|---|---|
| Parameter | – TCO Ass'y : TCO Assy + Insulation tape (Nomex tape A : 10 mm x 9 mm; Nomex tape B : 6 mm x 9 mm) | | |
| Temperature | 48.2℃ | 47.5℃ | 48.0℃ |
| Thermal Picture |  | |  |

(b)

|  | 2-1 | 2-2 | 2-3 |
|---|---|---|---|
| Parameter | – TCO Ass'y : TCO Assy + Graphite tape (Graphite tape A : 10 mm x 9 mm; Graphite tape B : 6 mm x 9 mm) | | |
| Temperature | 39.7℃ | 39.3℃ | 38.4℃ |
| Thermal Picture |  |  |  |

(c)

|  | 3-1 | 3-2 | 3-3 |
|---|---|---|---|
| Parameter | – TCO Ass'y : TCO Assy + Graphite tape (Graphite tape A : 15 mm x 9 mm; Graphite tape B : 10 mm x 9 mm) | | |
| Temperature | 37.4℃ | 38.1℃ | 38.5℃ |
| Thermal Picture |  |  |  |

BATTERY PACK AND MANUFACTURING METHOD THEREFOR

TECHNICAL FIELD

The present invention relates to a battery pack and a method for manufacturing the same, and more particularly, a battery pack in which a heat dissipation member is attached to a protection element assembly to reduce heat generated from the battery pack when being discharged and a method for manufacturing the same.

BACKGROUND ART

Typical battery packs are lithium secondary batteries and classified into cylindrical type, prismatic type, and pouch type in accordance with the shape of a battery case.

Among them, such a pouch-type lithium secondary battery (hereinafter, referred to as a battery pack) has flexibility and also has a relatively free shape, is lightweight, and has excellent safety, and thus, demand for portable electronic devices such as mobile phones, camcorders, and notebook computers is increasing.

A variety of combustible materials are contained in the battery pack, and thus, the battery pack has a serious disadvantage in terms of safety because of the risk of overcharging, overcurrent, other physical external impacts, and the like, resulting in heat generation and explosion.

Thus, the battery pack is provided with a protection circuit module (PCM) for continuously detecting a value such as a voltage, current, a temperature and effectively controlling an abnormal state thereof, which is determined on the basis of the detected value and a safety element such as a fuse-type positive temperature coefficient (PTC) element and a thermal cut-out (TCO) element.

In general, the TCO element is connected to the PCM to transmit a signal to the PCM when an appropriate temperature is detected when the battery is overheated to drive a protection circuit of the battery, thereby preventing a safety accident from occurring due to the overheating of the battery.

The TCO element has a structure in which a pair of conductive thin plates (a metal plate having a thin plate shape and made of a nickel material), each of which has a thin thickness, are connected to both terminals through welding processing and is mounted on a battery cell.

The battery pack in accordance with the related art includes a TCO assembly accommodation part in which a TCO assembly is mounted, and the TCO assembly is connected to a positive electrode or a negative electrode of the battery cell.

The positive electrode or the negative electrode of the battery cell may be bent so that the TCO assembly is mounted in the TCO assembly accommodation part.

Also, the TCO assembly accommodation part is coated with or coupled to an electrically insulating material to form an insulated state between a battery cell case and the TCO assembly and protect the TCO assembly against an external impact.

However, the battery pack may generate additional heat due to the TCO assembly when being discharged, and thus, the battery pack may be deteriorated in performance.

Therefore, it is required to develop a technique for reducing heat generation due to the TCO assembly when being discharged.

PRIOR ART DOCUMENTS

Patent Documents (Patent Document 1) KR2016-0138809 A

DISCLOSURE OF THE INVENTION

Technical Problem

The present disclosure provides a battery pack that is capable of reducing an increase in temperature due to a TCO assembly and a method for manufacturing the same.

Technical Solution

In accordance with an exemplary embodiment, a battery pack includes: a battery cell; a battery cell case in which the battery cell is mounted and which includes a protection element assembly accommodation part in an upper end thereof; and a protection element assembly connected to a positive electrode lead part or a negative electrode lead part of the battery cell case and mounted in the protection element assembly accommodation part, wherein the protection element assembly includes: a high-temperature cut-off element on which a metal thin plate is disposed on each of both sides thereof; a plate-shaped conductive connection member including a first bonding part bonded to the positive electrode lead part or the negative electrode lead part of the battery cell case, a second bonding part bonded to one side of the high-temperature cut-off element, and a third bonding part bonded to the other side of the high-temperature cut-off element; and a heat dissipation member disposed on a surface of an upper end of each of the first, second, and third bonding parts of the connection member.

The battery cell case may have a battery cell accommodation region, in which the battery cell is accommodated, in a region that does not overlap the protection element assembly accommodation part.

The connection member may include a stepped part that is bent to reduce a height difference from the negative electrode lead part or the positive electrode lead part of the battery cell case.

The heat dissipation member may be applied as a paste or attached as a tape.

In accordance with another exemplary embodiment, a method for manufacturing a battery pack includes: a battery cell assembly preparation process of mounting a battery cell in a battery cell case to prepare a battery cell assembly; a lead part connection process of electrically connecting a protection element assembly including a high-temperature cut-off element to a positive electrode lead part or a negative electrode lead part of the battery cell case; and a heat dissipation member attaching process of attaching a heat dissipation member to the portion at which the positive electrode lead part or the negative electrode lead part is connected to a protection element assembly in the lead part connection process.

The battery cell assembly preparation process may further include a battery cell coupling process of electrically coupling a top of the battery cell mounted in the battery cell accommodation part of the battery cell case to a case lead part of the battery cell case.

The method may further include, before the lead part connection process, a high-temperature cut-off element bonding process of bonding the high-temperature cut-off element to the protection element assembly.

The method may further include, before the heat dissipation member attaching process, a protection element assembly mounting process of mounting the protection element assembly in a protection element assembly accommodation part of the battery cell case.

The heat dissipation member attaching process may further include attaching the heat dissipation member at a portion at which the protection element assembly and the high-temperature cut-off element are bonded to each other.

The method may further include, after the heat dissipation member attaching process, a connection member bending process of bending a connection member of the protection element assembly to reduce a height difference between the negative electrode lead part or the positive electrode lead part of the battery cell case and the connection member of the protection element assembly.

Advantageous Effects

In the battery pack and the method for manufacturing the same in accordance with the exemplary embodiment, the heat dissipation member may be attached to the TCO bonding portion within the TCO assembly to reduce the heat generation due to the bonding of the TCO assembly.

DETAILED DESCRIPTION OF EMBODIMENTS

Hereinafter, embodiments of the present invention will be described in detail with reference to the accompanying drawings. However, the present invention is not limited to the embodiments below. Rather, these embodiments are provided so that this disclosure will be thorough and complete, and will fully convey the scope of the present invention to those skilled in the art.

Also, it will be understood that although the ordinal numbers such as first and second are used herein to describe various elements, these elements should not be limited by these numbers. The terms are only used to distinguish one component from other components. For example, a first element referred to as a first element in one embodiment can be referred to as a second element in another embodiment without departing from the scope of the appended claims. In the following description, the technical terms are used only for explaining a specific exemplary embodiment while not limiting the present invention. The terms of a singular form may include plural forms unless referred to the contrary.

While the term used in the present invention selects general terms that are widely used at present in consideration of the functions of the present invention, it is to be understood that this may vary depending on the intention or judicial precedent of those skilled in the art, the emergence of new technology, and the like. Also, in certain cases, there may be a term chosen arbitrarily by the applicant, and in this case, the meaning thereof will be described in detail in the description of the corresponding invention. Thus, the term used in the present invention should be defined based on the meaning of the term, not on the name of a simple term, but on the entire contents of the present invention.

Embodiment 1

Hereinafter, a battery pack in accordance with an exemplary embodiment will be described.

In the battery pack in accordance with the exemplary embodiment, the heat dissipation member may be attached to a bonding portion of a protection element assembly, to which a high-temperature cut-off element is bonded, to reduce heat generation of the battery pack when being discharged.

Figure 1:
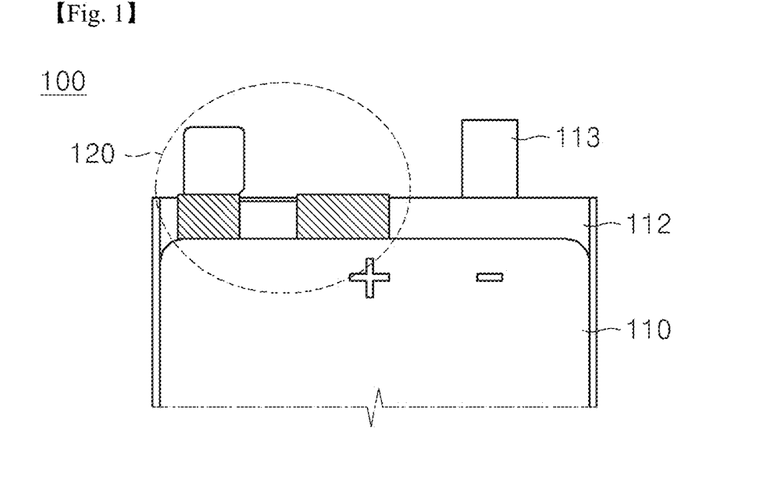
FIG. 1 is a view of a battery pack in which a protection element assembly is bonded to a positive electrode lead part in accordance with an exemplary embodiment.

FIG. 1 is a view of a battery pack in which a protection element assembly is bonded to a positive electrode lead part in accordance with an exemplary embodiment.

Referring to FIG. 1, a battery pack 100 in accordance with an exemplary embodiment includes a battery cell 111, a battery cell case 110 in which the battery cell 111 is mounted and which includes a protection element assembly accommodation part 112 on an upper end thereof, and a protection element assembly 120 mounted in the protection element assembly accommodation part 112 of the battery cell case and including a connection member to which a high-temperature cut-off element is mounted.

Also, in the protection element assembly 120, a heat dissipation member is attached to a bonding portion in which the high-temperature cut-off element is bonded to a connection member to reduce heat generated from the bonding portion when being discharged.

Also, each of constituents of the battery pack 100 will be described in more detail with reference to FIG. 2.

Figure 2:
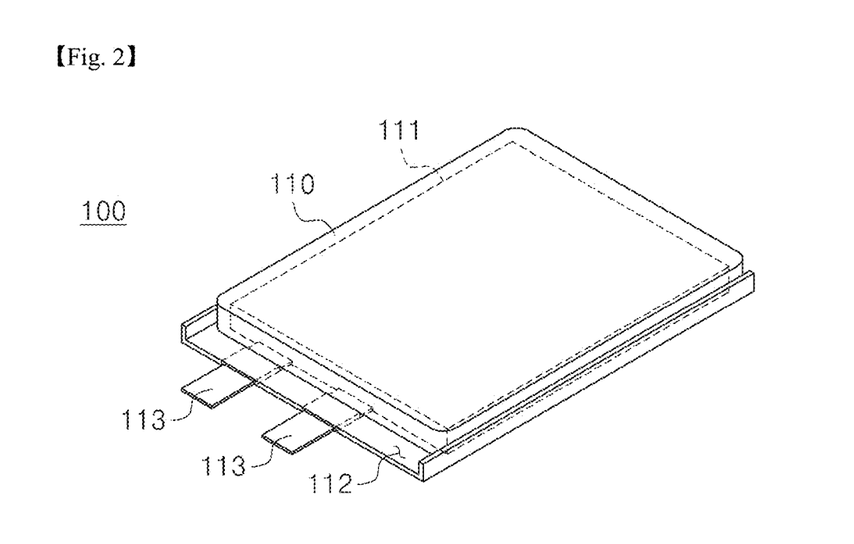
FIG. 2 is a perspective view of a battery cell and a battery cell case within a battery pack in accordance with an exemplary embodiment.

FIG. 2 is a perspective view of the battery cell and the battery cell case within the battery pack in accordance with an exemplary embodiment.

Referring to FIG. 2, since the battery cell 111 generally uses a lithium secondary battery, the battery cell 111 has a structure in which a plurality of positive electrodes (aluminum foil) and negative electrodes (copper foil) are laminated with a separator therebetween.

Then, a positive electrode tab is welded to each of the positive electrodes, and a negative electrode tab is welded to each of the negative electrodes. Thereafter, the positive electrode and the negative electrode are wrapped and sealed by an aluminum pouch.

Also, since the aluminum pouch wrapping the battery cell is manufactured based on a highly ductile property and a thin aluminum layer, the battery cell case 110 may be additionally mounted to maintain the form of the battery cell and protect the inside of the battery cell case 110 against an external impact.

Also, the battery cell case 110 includes a protection element assembly accommodation part 112 for the coupling with the protection element assembly 120 and a case lead part 113 electrically connected to a tab of the battery pack 111. Here, each of the above-described constituents is provided on an upper end of the battery cell case.

Also, the protection element assembly accommodation part 112 may be provided in a predetermined range except for a lead formation portion so that the protection element assembly 120 is coupled. Then, an adhesive may be applied to, or a double-sided tape is attached to the protection element assembly accommodation part 112.

Also, the battery pack 111 is accommodated in a battery pack accommodation region within the battery cell case 110 provided in a region that does not overlap the protection element assembly accommodation part 112.

Also, the case lead part 113 of the battery cell case is electrically connected to the tab of the battery cell 111. A constituent extending from the case lead part 113 to the inside of the battery cell case 110 may be welded to the tab of the battery cell 111 so that the battery cell 111 and the case are electrically connected to each other.

The protection element assembly 120 may be a constituent in which the high-temperature cut-off element is bonded to the connection member and will be described below in more detail with reference to FIG. 3.

Figure 3:
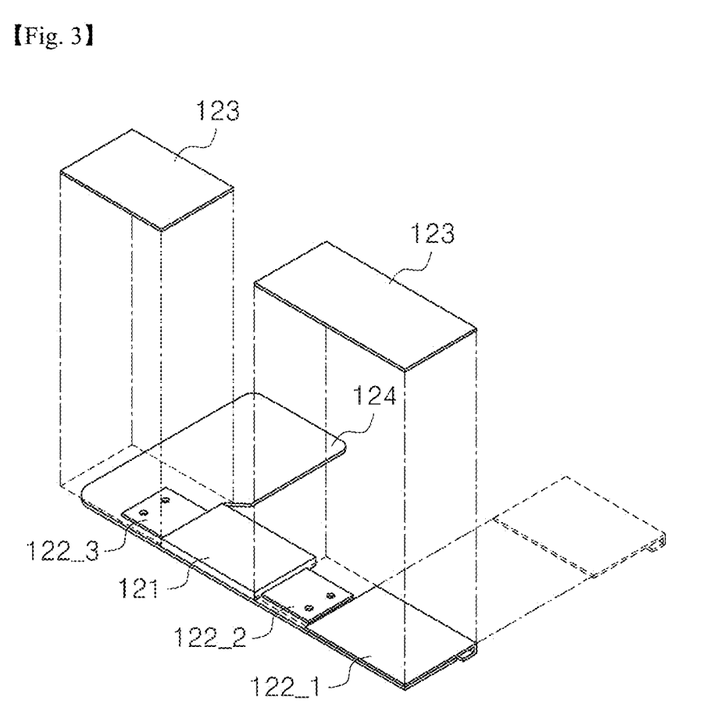
FIG. 3 is a perspective view of a protection element assembly within the battery pack in which the protection element assembly is bonded to a positive electrode lead part in accordance with an exemplary embodiment.

FIG. 3 is a perspective view of the protection element assembly within the battery pack in which the protection element assembly is bonded to the positive electrode lead part in accordance with an exemplary embodiment.

Referring to FIG. 3, the protection element assembly 120 includes a high-temperature cut-off element 121 on which a metal thin plate for bonding is disposed on each of both sides, a conductive connection member 122 having a plate shape and including a first bonding part 122_1 bonded to a positive electrode lead part or a negative electrode lead part of the case lead part 113 of the battery cell case, a second bonding part 122_2 bonded to one side of the high-temperature cut-off element, and a third bonding part 122_3 bonded to the other side of the high-temperature cut-off element, and a heat dissipation member 123 disposed on a surface of each of top ends of the first bonding part 122_1, the second bonding part 122_2, and the third bonding part 122_3 of the connection member.

Also, the protection element assembly 120 further includes a stepped part 124 that is bent to reduce a height difference with the negative electrode lead part or the positive electrode lead part of the battery cell case 110.

Also, the protection element assembly 120 is connected to a protection circuit module (PCM) to transmit a signal to the PCM when an appropriate temperature is detected when the battery is overheated to drive a protection circuit of the battery, thereby preventing a safety accident from occurring due to the overheating of the battery.

Here, the bonding may be, for example, spot welding, laser welding, or ultrasonic welding.

Also, the high-temperature cut-off element 121 has a structure in which a pair conductive thin plates (a metal plate having a thin plate shape and made of a nickel material), each of which has a thin thickness, are connected to both terminals through welding so as to be bonded.

Also, the connection member 122 includes the first bonding part 122_1 having a vertically bent flat shape and a conductive property and bonded to the positive electrode lead part or the negative electrode lead part of the case lead part 113 of the battery cell case, the second bonding part 122_2 bonded to one side of the high-temperature cut-off element, and a third bonding part 122_3 bonded to the other side of the high-temperature cut-off element.

Also, the connection member 122 may have a "¬" shape as one structure or manufactured by bonding or adhering two plates to each other. The connection member 122 may be changed in shape and structure in accordance with a position at which the protection circuit module is disposed.

Also, the connection member 122 may include a connection member lead part instead of the positive electrode lead part or the negative electrode lead part in the case lead part 113.

Also, since the connection member 122 is connected to the protection circuit module, the connection member 122 may be made of the same material as the positive electrode lead part or the negative electrode lead part or made of a different conductive metal.

Also, the heat dissipation member 123 may be attached to a surface of an upper end of the first bonding part 122_1 at which the case lead part 113 and the protection circuit element assembly 120 are bonded to each other to reduce heat due to the bonding.

In the case of reducing heat generation during discharging, since the protection element assembly 120 is bonded to the positive electrode lead part, the heat dissipation member 123 is attached to the portion at which the positive electrode lead part and the protection element assembly 120 are bonded to each other.

In the case of reducing heat generation during charging, since the protection element assembly 120 is bonded to the negative electrode lead part, the heat dissipation member 123 is attached to the portion at which the negative electrode lead part and the protection element assembly 120 are bonded to each other.

Also, the second bonding part 122_2 may be disposed close to the first bonding part 122_1 so that the heat dissipation member is attached at a time when the heat dissipation member is attached. The third bonding part 122_3 may be disposed at the bent portion to minimize a size of the protection element assembly 120 on the whole.

Here, the heat dissipation member 123 may be provided as a graphite sheet to realize not only an insulation effect but also a heat dissipation effect.

Also, the heat dissipation member 123 may be made of other materials or may be formed in the form of paste to be applied on the bonding portion and a tape to be attached.

Also, the heat dissipation member may have a size to be formed on not only the bonding portion but also the entire protection element assembly 120 or only a local area to be bonded.

Also, the heat dissipation member 123 may also be attached to the protection element assembly accommodation part 112 to perform the heat dissipation function as well as the insulation function instead of the conventional insulation tape.

The protection element assembly 120 coupled to the case lead part 113 is bent to be mounted in the protection element assembly accommodation part 112.

Thus, the stepped part 124 may be provided for solving a limitation in connection due to a height difference between the connection member lead part of the connection member 122 and the other case lead part 113 that is not connected to the protection element assembly 120 when being connected to the protection circuit module.

Also, the results that heat generation is reduced in accordance with the constituents of the battery pack will be described in detail with reference to FIG. 4.

Figure 4:
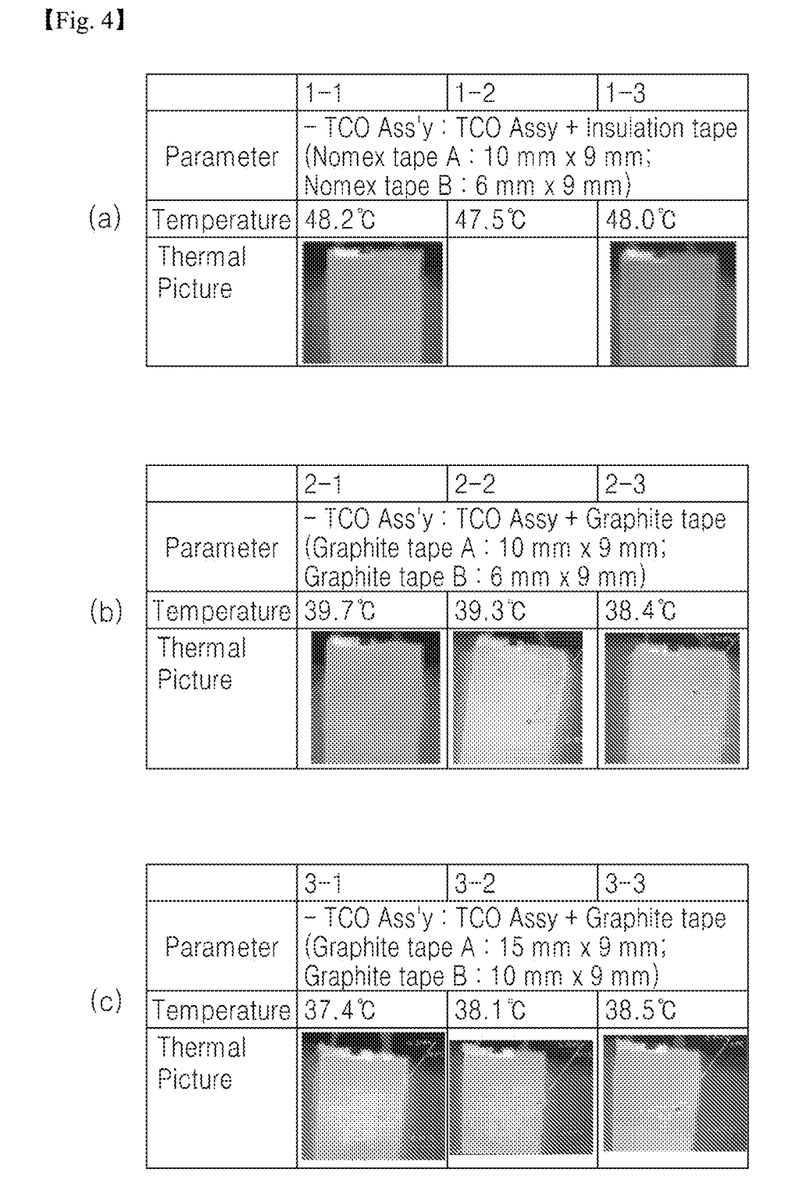
FIG. 4 is a view illustrating an example of a variation in temperature of the battery pack when being discharged in accordance with an exemplary embodiment.

FIG. 4 is a view illustrating an example of a variation in temperature of the battery pack when being discharged in accordance with an exemplary embodiment.

Referring to FIG. 4, when the same current and voltage flow at the same temperature, (a) of FIG. 4 shows a discharging performance temperature when a general insulation tape is attached. It is seen that the entire battery is maintained at a high temperature exceeding 47° C. during the discharging.

Also, (b) of FIG. 4 shows a discharging performance temperature when a graphite tape is attached. It is seen that the temperature is maintained at a temperature less than approximately 10° C. than that in (a) of FIG. 4.

Also, (c) of FIG. 4 shows a temperature of the battery pack in which the discharging is performed when the graphite tape in the increasing range is attached. It is seen that the heat generation is reduced by approximately 2° C. as compared with (b) of FIG. 4.

Here, experiments were carried out under conditions of room temperature of 22.4° C., discharge current of 4.0 A, and a voltage of 3.0 V in (a), (b), (c) of FIG. 4.

Also, when the heat dissipation member is attached, different structures in addition to the notebook type pouch cell structure may be applied, and this will be described in detail with reference to FIG. 5.

Figure 5:
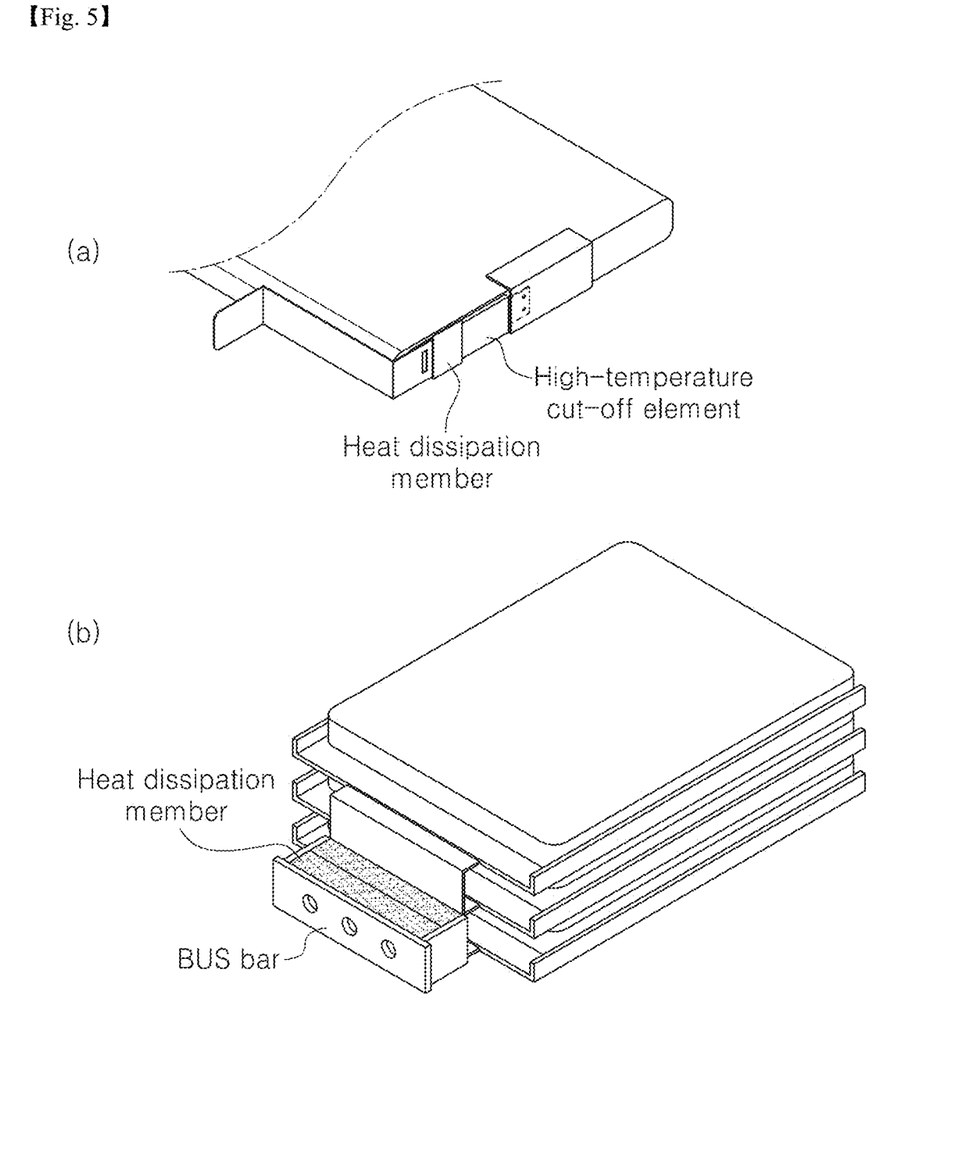
FIG. 5 is a view illustrating a structure of a battery pack in accordance with another exemplary embodiment.

FIG. 5 is a view illustrating a structure of a battery pack in accordance with another exemplary embodiment.

Referring to FIG. 5, a prismatic type pouch cell illustrated in (a) of FIG. 5 has a structure manufactured by successively laminating a PCB including a high-temperature cut-off element and a protection circuit on an upper end of a metal can-type battery pack and then covering a top cap on the laminate.

Since this structure also has the high-temperature cut-off element like the notebook-type pouch cell, a heat dissipation member may be attached to each of a bonding portion at which the battery pack and the high-temperature cut-off element are bonded to each other and a bonding portion at which a PCB lead part and the high-temperature cut-off element are bonded to each other to reduce heat generated during discharging. Here, although the description has been made on the assumption that only the heat dissipation member is attached to only a portion of the high-temperature cut-off element, the heat dissipation member may be attached to both ends of the high-temperature cut-off member to reduce the heat generation during the discharging.

Also, the pouch cell for vehicles illustrated in (b) of FIG. 5 is similar to that of the present disclosure, but an electrode terminal is disposed in a battery case provided in each of upper and lower ends to electrically connect a plurality of battery cells to a bus bar and thereby to form a battery pack.

Here, the electrode terminal of one battery cell is bonded to the electrode terminal of the other battery cell and connected to one bus bar. Thus, heat is generated at the bonding portion during the discharging like the exemplary embodiment.

Thus, the heat dissipation member may be attached to the bonding portion as illustrated in (b) of FIG. 5 to reduce heat generation.

Also, although the description has been made on the assumption that only the heat dissipation member is partially attached, the heat dissipation member may also be attached to an opposite side to quickly transfer heat.

Embodiment 2

Hereinafter, a method for manufacturing the battery pack in accordance with an exemplary embodiment will be described.

In a method for manufacturing a battery pack in accordance with an exemplary embodiment, a battery cell assembly in which a battery cell is mounted in a battery cell case is prepared, and then, a protection element assembly is bonded to a lead part of the battery cell case, and a heat dissipation member is attached to the bonding portion to reduce a temperature of heat generated in the battery pack.

Figure 6:
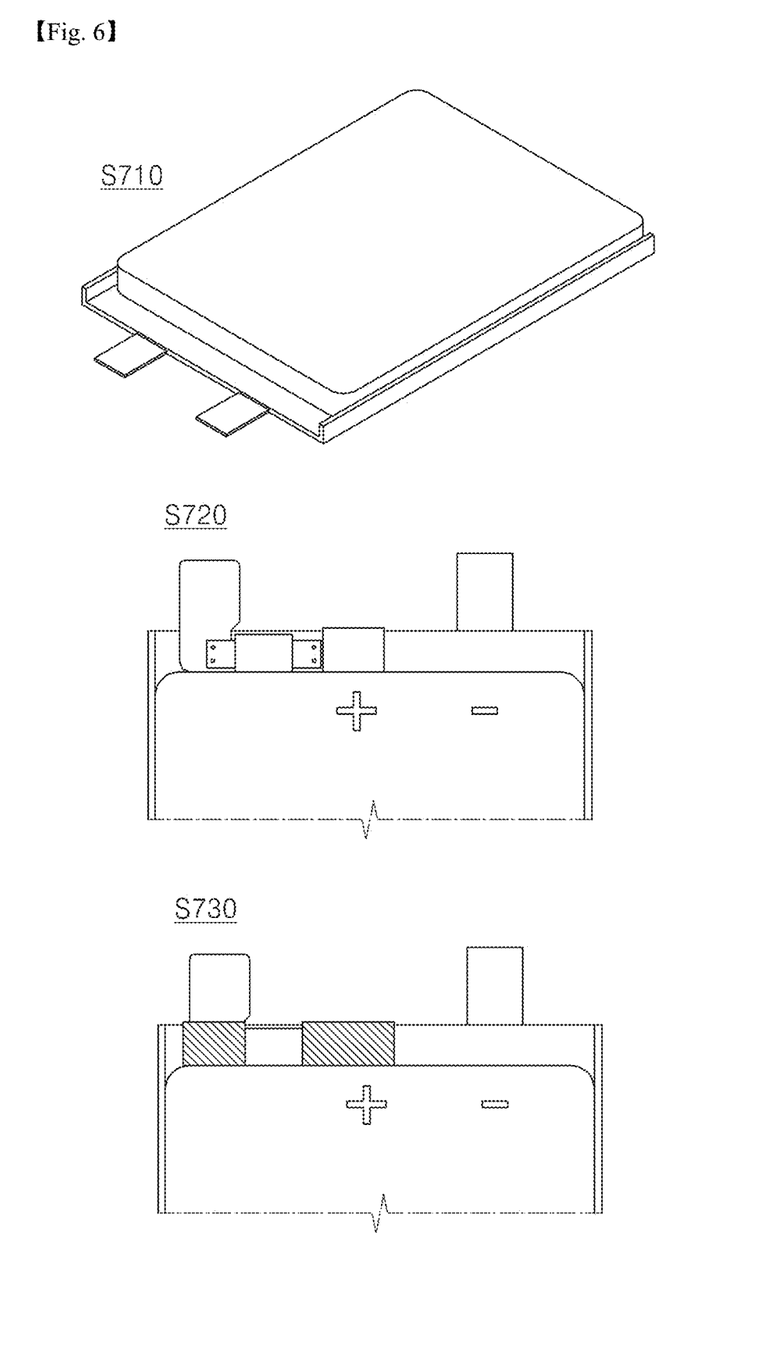
FIG. 6 is a schematic view illustrating a method for manufacturing a battery pack in accordance with an exemplary embodiment.

FIG. 6 is a schematic view illustrating a method for manufacturing the battery pack in accordance with an exemplary embodiment.

Referring to FIG. 6, in a method for manufacturing the battery pack in accordance with an exemplary embodiment, a battery cell is mounted in a battery cell case to prepare a battery cell assembly (a battery cell assembly preparation process: S710).

Then, a protection element assembly including a high-temperature cut-off element is electrically connected to a positive electrode lead part or a negative electrode lead part of the battery cell case (a lead part connection process: S720), and a heat dissipation member is attached to the portion at which the positive electrode lead part or the negative electrode lead part is connected to the protection element assembly (a heat dissipation member attaching process: S730).

Also, each of the steps in the method for manufacturing the battery pack will be described below in more detail.

The battery cell preparation process (S710) is a process of preparing the battery cell having a sealed pouch shape and inserting the battery cell into a case. Here, various pouch-type battery cells such as a lithium polymer cell, a nickel cadmium cell, a nickel hydrogen cell, a nickel zinc cell, and the like as well as the lithium ion cell may be prepared.

For example, in the process of preparing the lithium ion cell, a plurality of positive electrode (aluminum foil) and negative electrode (copper foil) are laminated with a separator therebetween to form the battery cell.

Then, a positive electrode tab is welded to a positive electrode, and a negative electrode tab is welded to a negative electrode. Thereafter, the positive electrode and the negative electrode are wrapped and sealed by an aluminum pouch.

In more detail, the process of manufacturing the battery cell is largely divided into three processes such as an electrode process, an assembly process, and an activation process. In the electrode process, materials for forming the positive electrode and the negative electrode are mixed at a proper ratio.

Then, the positive electrode is coated with aluminum, and the negative electrode is coated with copper foil. Thereafter, a roll process is performed to form a flat shape having a predetermined thickness, and a slitting process is performed to be sliced to match an electrode size.

Also, in the assembly process, a notching process for removing an unnecessary portion from the electrode is performed, and a positive electrode material, a separator, and a negative electrode material are alternately laminated on top of another. Then, a stack and folding process for folding the laminate several times according to capacity of the battery or a winding process for overlapping and rolling the electrodes and the separator are performed. Then, the product is packaged by using an aluminum film package, an electrolyte is injected, and a sealing process for forming a vacuum state is performed.

Finally, in the activation (formation) process, the assembled battery pack is repeatedly charged and discharged to activate the battery pack. The activation process is a process for performing a degassing process for exhausting a gas generated in the battery pack during the activation.

Also, after the battery cell is prepared, a battery cell coupling process, in which the battery cell prepared in the battery cell assembly preparation process (S710) is mounted in a battery cell accommodation part of the battery cell case including a battery cell accommodation part, a protection element assembly accommodation part, and a case lead part, and the mounted battery cell and the case lead part of the battery cell case are electrically connected to each other, is further performed.

This is done because the battery cell case is maintained in the form of the battery cell that is simply packed by using the aluminum film package and protects the inside thereof against an external impact. Thus, the cell case is mounted on the battery pack.

Thus, the battery cell is mounted in the battery cell accommodation part that is provided below the battery cell case, and a tab leading out from the battery cell is connected to the case lead part provided on the battery cell case through welding. Then, an upper side of the batter cell case is covered to complete the assembly process.

Also, the lead part connection process (S720) is a process of electrically connecting the protection element assembly including a high-temperature cut-off element to the positive electrode lead part or the negative electrode lead part of the battery cell case prepared in the battery cell assembly preparation process (S710). Here, the protection element assembly is bonded and coupled to a lead withdrawn from the battery cell case.

Also, before the lead part connection process (S720), a high-temperature cut-off element bonding process of bonding the high-temperature cut-off element to the protection element assembly is performed to simplify the process of manufacturing the battery pack.

Also, before the heat dissipation member attaching process (S730), a protection element assembly mounting process of mounting the protection element assembly in the protection element assembly accommodation part of the battery cell case is further performed.

Thus, the protection element assembly and the lead part of the battery cell case may be protected against the outside by the protection element assembly accommodation part.

Also, the heat dissipation member attaching process (S730) is a process of attaching a heat dissipation member to a portion at which the positive electrode lead part or the negative electrode lead part and the protection element assembly are connected in the lead part connection process. Here, the heat dissipation member may also be attached to the portion at which the protection element assembly and the high-temperature cut-off element are bonded to each other to reduce heat generated from the bonding portion during the discharging.

Also, after the heat dissipation attaching process, a connection member bending process of bending a connection member is additionally performed to quickly perform the process of manufacturing the battery pack.

Thus, before being coupled to the protection circuit module, a height difference between the negative electrode terminal or the positive electrode terminal of the battery cell case and the connection member of the protection element assembly may be reduced to secure flatness.

DESCRIPTION OF REFERENCE SYMBOLS

100: Battery Pack
110: Battery cell case
111: Battery cell
112: Protection Element Assembly Accommodation Part
113: Case Lead part
120: Protection Element Assembly
121: High-Temperature Cut-off Element
122: Connection Member
122_1: First Bonding Part
122_2: Second Bonding Part
122_3: Third Bonding Part
123: Heat Dissipation Member
124: Stepped Part

What is claimed is:

1. A battery pack comprising:
a battery cell;
a battery cell case in which the battery cell is mounted and which comprises a protection element assembly accommodation part in an upper end thereof; and
a protection element assembly connected to a positive electrode lead part or a negative electrode lead part of the battery cell case and mounted in the protection element assembly accommodation part,
wherein the protection element assembly comprises:
a high-temperature cut-off element on which a metal thin plate for bonding is disposed on each of both sides thereof;
a plate-shaped conductive connection member comprising a first bonding part bonded to the positive electrode lead part or the negative electrode lead part of the battery cell case, a second bonding part bonded to a first side of the high-temperature cut-off element, and a third bonding part bonded to a second side of the high-temperature cut-off element, the second side being opposite to the first side; and
a first heat dissipation member disposed on a surface of an upper end of the first bonding part of the connection member and a surface of an upper end of the second bonding part of the connection member and a second heat dissipation member disposed on a surface of an upper end of the third bonding part of the connection member.

2. The battery pack of claim 1, wherein the battery cell case has a battery cell accommodation region, in which the battery cell is accommodated, in a region that does not overlap the protection element assembly accommodation part.

3. The battery pack of claim 1, wherein the connection member comprises a stepped part that is bent to reduce a height difference from the negative electrode lead part or the positive electrode lead part of the battery cell case.

4. The battery pack of claim 1, wherein the heat dissipation member is applied as a paste or attached as a tape.

5. The battery pack of claim 1, wherein the connection member is L-shaped.

6. The battery pack of claim 1, wherein the protection element assembly accommodation part has an upper edge, and
wherein the connection member and one of the positive electrode lead part and negative electrode lead part extends above the upper edge of the protection element assembly accommodation part.

7. A method for manufacturing a battery pack, the method comprising:
a battery cell assembly preparation process of mounting a battery cell in a battery cell case to prepare a battery cell assembly;
a lead part connection process of electrically connecting a protection element assembly comprising a high-temperature cut-off element to a positive electrode lead part or a negative electrode lead part of the battery cell case by bonding a first bonding part to the positive electrode lead part or the negative electrode lead part of the battery cell case, bonding a second bonding part to a first side of the high-temperature cut-off element, and bonding a third bonding part to a second side of the high-temperature cut-off element, the second side being opposite to the first side; and a heat dissipation member attaching process of attaching a first heat dissipation member on a surface of an upper end of the first bonding part and a surface of an upper end of the second bonding part and a second heat dissipation member on a surface of an upper end of the third bonding part.

8. The method of claim 7, wherein the battery cell assembly preparation process further comprises a battery cell coupling process of electrically coupling a top of the battery cell mounted in a battery cell accommodation part of the battery cell case to a case lead part of the battery cell case.

9. The method of claim 7, further comprising, before the lead part connection process, a high-temperature cut-off element bonding process of bonding the high-temperature cut-off element to the protection element assembly.

10. The method of claim 7, further comprising, before the heat dissipation member attaching process, a protection element assembly mounting process of mounting the protection element assembly in a protection element assembly accommodation part of the battery cell case.

11. The method of claim 7, wherein the heat dissipation member attaching process further comprises attaching the heat dissipation member at a portion at which the protection element assembly and the high-temperature cut-off element are bonded to each other.

12. The method of claim 7, further comprising, after the heat dissipation member attaching process, a connection member bending process of bending a connection member of the protection element assembly to reduce a height difference between the negative electrode lead part or the positive electrode lead part of the battery cell case and the connection member of the protection element assembly.

* * * * *